(12) United States Patent
Wu

(10) Patent No.: US 11,259,203 B2
(45) Date of Patent: Feb. 22, 2022

(54) DEVICE AND METHOD OF HANDLING COMMUNICATION DEVICE CAPABILITIES

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/238,531

(22) Filed: Jan. 3, 2019

(65) Prior Publication Data

US 2019/0215714 A1 Jul. 11, 2019

Related U.S. Application Data

(60) Provisional application No. 62/614,485, filed on Jan. 7, 2018.

(51) Int. Cl.
*H04W 28/02* (2009.01)
*H04L 5/00* (2006.01)
(Continued)

(52) U.S. Cl.
CPC ....... *H04W 28/0215* (2013.01); *H04L 5/0035* (2013.01); *H04L 5/0098* (2013.01); *H04W 8/22* (2013.01); *H04W 24/02* (2013.01); *H04W 76/15* (2018.02); *H04B 7/0413* (2013.01); *H04L 5/001* (2013.01); *H04L 5/0064* (2013.01); *H04L 5/0094* (2013.01); *H04W 36/0069* (2018.08)

(58) Field of Classification Search
CPC ... H04W 24/02; H04W 28/0215; H04W 8/22; H04W 8/24; H04W 36/0069; H04W 76/15; H04L 5/0035; H04L 5/0098; H04L 5/0094; H04L 5/0064; H04B 7/0413
See application file for complete search history.

(56) References Cited

U.S. PATENT DOCUMENTS

2014/0146697 A1\* 5/2014 Kim ................ H04B 7/0413
370/252
2015/0215944 A1 7/2015 Kim
(Continued)

FOREIGN PATENT DOCUMENTS

CN 102714816 A 10/2012
CN 105165050 A 12/2015
(Continued)

OTHER PUBLICATIONS

3GPP TS 36.331 V15.0.0, Dec. 2017.
(Continued)

*Primary Examiner* — Raymond S Dean
(74) *Attorney, Agent, or Firm* — Winston Hsu

(57) ABSTRACT

A first base station (BS) for handling communication device capabilities comprises at least one storage device storing instructions of receiving a first band combination (BC) and a second BC, from a communication device, a second BS or a core network; indicating the first BC as an allowed BC in an allowed BC information element (IE); transmitting a Secondary Node (SN) Addition Request message to a third BS, wherein the SN addition request message comprises the first BC and the second BC, and comprises the allowed BC IE; and receiving a SN Addition Request Acknowledge message for responding to the SN Addition Request message, from the third BS.

12 Claims, 5 Drawing Sheets

(51) Int. Cl.
*H04W 8/22* (2009.01)
*H04W 76/15* (2018.01)
*H04W 24/02* (2009.01)
*H04W 36/00* (2009.01)
*H04B 7/0413* (2017.01)

(56) References Cited

U.S. PATENT DOCUMENTS

| | | | |
|---|---|---|---|
| 2015/0271726 A1 | 9/2015 | Kim | |
| 2016/0066233 A1* | 3/2016 | Balachandran | H04W 76/16 370/331 |
| 2016/0262118 A1 | 9/2016 | Kim | |
| 2017/0048839 A1 | 2/2017 | Henttonen | |
| 2017/0237524 A1* | 8/2017 | Ahn | H04L 1/1835 714/799 |
| 2017/0367073 A1* | 12/2017 | Murugan | H04B 1/0053 |
| 2018/0139750 A1* | 5/2018 | Takahashi | H04B 7/06 |
| 2018/0359672 A1* | 12/2018 | Keller | H04L 67/141 |
| 2019/0281645 A1* | 9/2019 | Van Der Velde | H04W 8/24 |

FOREIGN PATENT DOCUMENTS

| | | |
|---|---|---|
| CN | 105517043 A | 4/2016 |
| CN | 106134240 A | 11/2016 |

OTHER PUBLICATIONS

3GPP TS 38.331 V15.0.0, Dec. 2017.
Search Report dated Aug. 22, 2019 for EP application No. 19150558.5, pp. 1~7.
ZTE, ZTE Microelectronics, "Consideration on the capability coordination for LTE/NR tight interworking", 3GPP TSG-RAN WG2 Meeting #97bis, R2-1702833, Apr. 3-7, 2017, Spokane, USA, XP051244817, pp. 1-6.
Qualcomm Incorporated, "LTE/NR UE capability dependency and coordination", 3GPP TSG-RAN WG2 Meeting #99, R2-1707835, Aug. 21-25, 2017, Berlin, Germany, XP051317779, pp. 1-45.
NTT Docomo, Inc., "Inter Master Node handover with Secondary Node change", 3GPP TSG-RAN2#99, R2-1709403, Aug. 21-25, 2017, Berlin, Germany, XP051319134, pp. 1-5.
Search Report dated May 15, 2019 for EP application No. 19150558.5, pp. 1—18.
Liu/Chen et al., "LTE-NR dual connectivity technology discussion, from Mobile Communication Magazine", vol. 19, 2017, China, 2017.
Office action dated Jun. 18, 2021 for the China application No. 201910012496.7, filing date Jan. 7, 2019, pp. 1-7.
Qualcomm Incorporated, "LTE/NR UE capability dependency and coordination", 3GPP TSG-RAN WG2 Meeting #99, R2-1707835, Aug. 21-25, 2017, Berlin, Germany, pp. 1-45.
ZTE, ZTE Microelectronics, "Consideration on the capability coordination for LTE/NR tight interworking", 3GPP TSG-RAN WG2 Meeting #97bis, R2-1702833, Apr. 3-7, 2017, Spokane, USA, pp. 1-6.

* cited by examiner

DEVICE AND METHOD OF HANDLING COMMUNICATION DEVICE CAPABILITIES

CROSS REFERENCE TO RELATED APPLICATIONS

This application claims the benefit of U.S. Provisional Application No. 62/614,485, filed on Jan. 7, 2018, which is incorporated herein by reference.

BACKGROUND OF THE INVENTION

1. Field of the Invention

The present invention relates to a device and a method used in a wireless communication system, and more particularly, to a device and a method of handling communication device capabilities.

2. Description of the Prior Art

A new radio (NR) system, recently developed by the 3rd generation partnership project (3GPP), is regarded as a NR interface and radio network architecture that provides a high data rate, a low latency, a packet optimization, and an improved system capacity and coverage.

SUMMARY OF THE INVENTION

The present invention therefore provides a communication device and method for handling communication device capabilities to solve the abovementioned problem.

A first base station (BS) for handling communication device capabilities comprises at least one storage device and at least one processing circuit coupled to the at least one storage device. The at least one storage device stores, and the at least one processing circuit is configured to execute instructions of receiving a first band combination (BC) and a second BC, from a communication device, a second BS or a core network (CN); indicating the first BC as an allowed BC in an allowed BC information element (IE); transmitting a Secondary Node (SN) Addition Request message to a third BS, wherein the SN addition request message comprises the first BC and the second BC, and comprises the allowed BC IE; and receiving a SN Addition Request Acknowledge message for responding to the SN Addition Request message, from the third BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
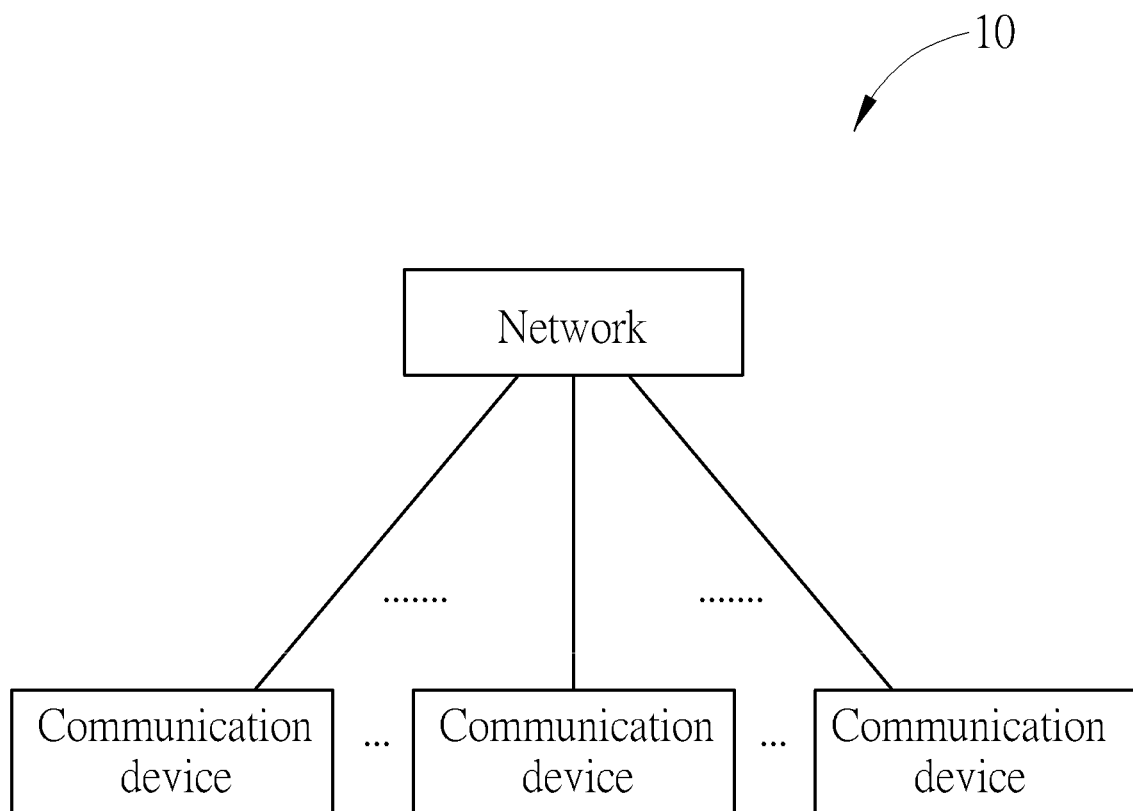
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and the communication device communicates with each other via one or multiple cells (e.g., one or multiple carriers) belonging to one or multiple base stations (BSs).

In FIG. 1, the network and the communication devices are simply utilized for illustrating the structure of the wireless communication system 10. The network includes at least one radio access network (RAN) including at least one BS. The at least one RAN may include at least one of an evolved Universal Terrestrial RAN (E-UTRAN), a next generation RAN (NG-RAN), a New Radio (NR) RAN, an evolved NR RAN or a sixth generation RAN (6G-RAN). The network may include at least one core network (CN). The at least one CN may be an evolved packet core (EPC), a fifth generation core (5GC) and/or a 6G core (6GC). In the E-UTRAN, the BS is an evolved Node-B (eNB) connecting to the EPC or the 5GC. In the NG-RAN/NR-RAN, the BS is a fifth generation Node-B (gNB). In the 6G-RAN, the BS is a 6G BS or an evolved gNB. The EPC may include at least one of a mobility management entity (MME) and a serving gateway (S-GW). The 5GC may include at least one of an Access and Mobility Management Function (AMF), a Session Management Function (SMF) and a User Plane Function (UPF). The 6GC may include at least one of a 6G AMF, a 6G SMF and a 6G UPF.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
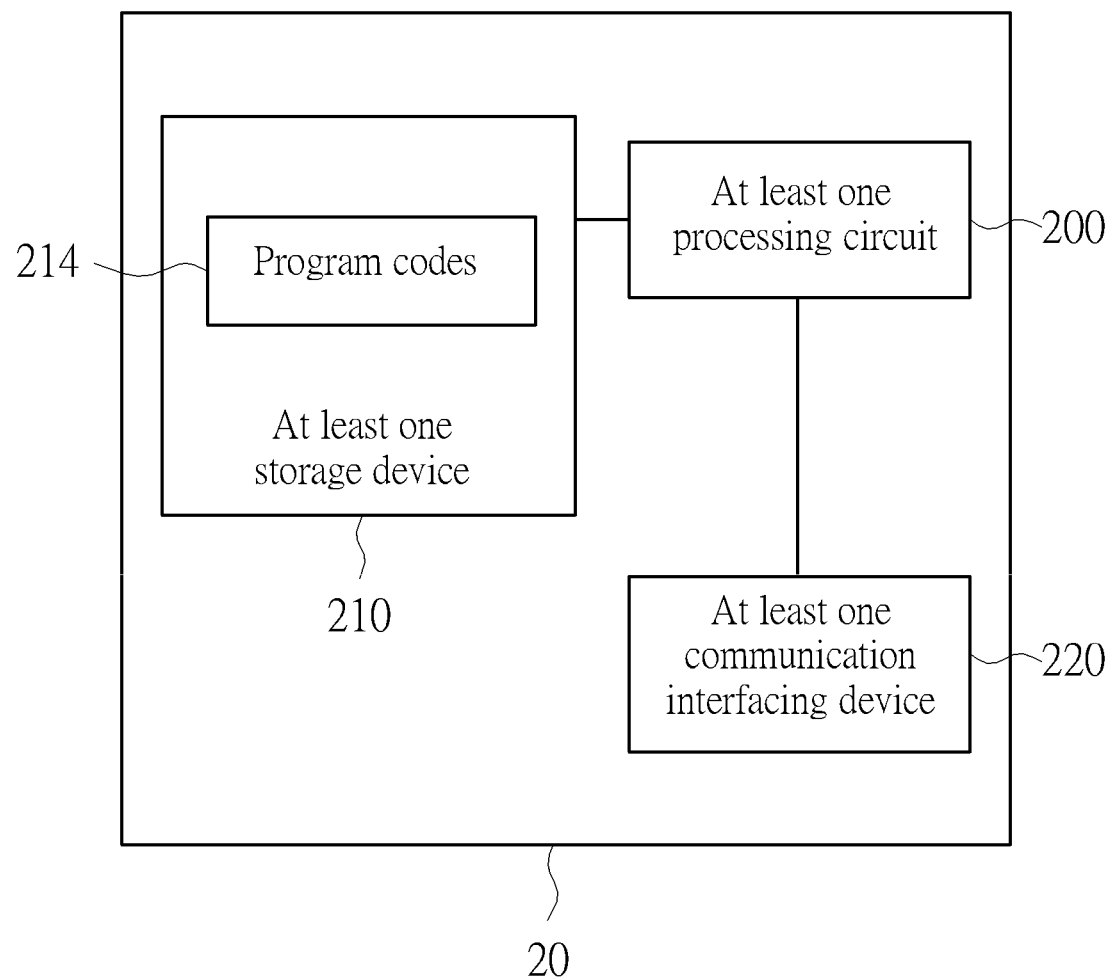
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing a communication device in FIG. 1, to simplify the illustration of the embodiments.

A baseband capability combination includes at least one of baseband capabilities of which a UE is capable to process transmissions or receptions within baseband chip(s) of the UE. The baseband capabilities include a DL bandwidth class(es), an UL bandwidth class(es), a multiple input multiple output (MIMO) layer (s), a modulation order(s) and a subcarrier spacing(s) (SCS(s)). For example, a UL or DL bandwidth class may be indicated by a character of a, b, c, d, e, f, g, h, i, . . . , etc., a MIMO layer may be 2, 4, 8 or 16, a modulation order may be Phase Shift Keying (PSK) or Quadrature Amplitude Modulation (QAM), and a SCS may be 15 kHZ, 30 kHz, 60 kHz, 120 kHz, 240 kHz or 480 kHz. A UE may transmit the baseband capability combination to a BS. The UE and the BS communicate with each other by using the baseband capability combination supported by the UE. In some cases, the UE may not support the same baseband capabilities for all frequency bands which the UE supports. The UE and the BS may communicate with each other according to the baseband capability combination in a first frequency band. However, the communication in a second frequency band between the UE and another BS may fail, since the UE does not support one or more of baseband capabilities in the baseband capability combination for the second frequency band. Embodiments below would solve this problem.

Figure 3:
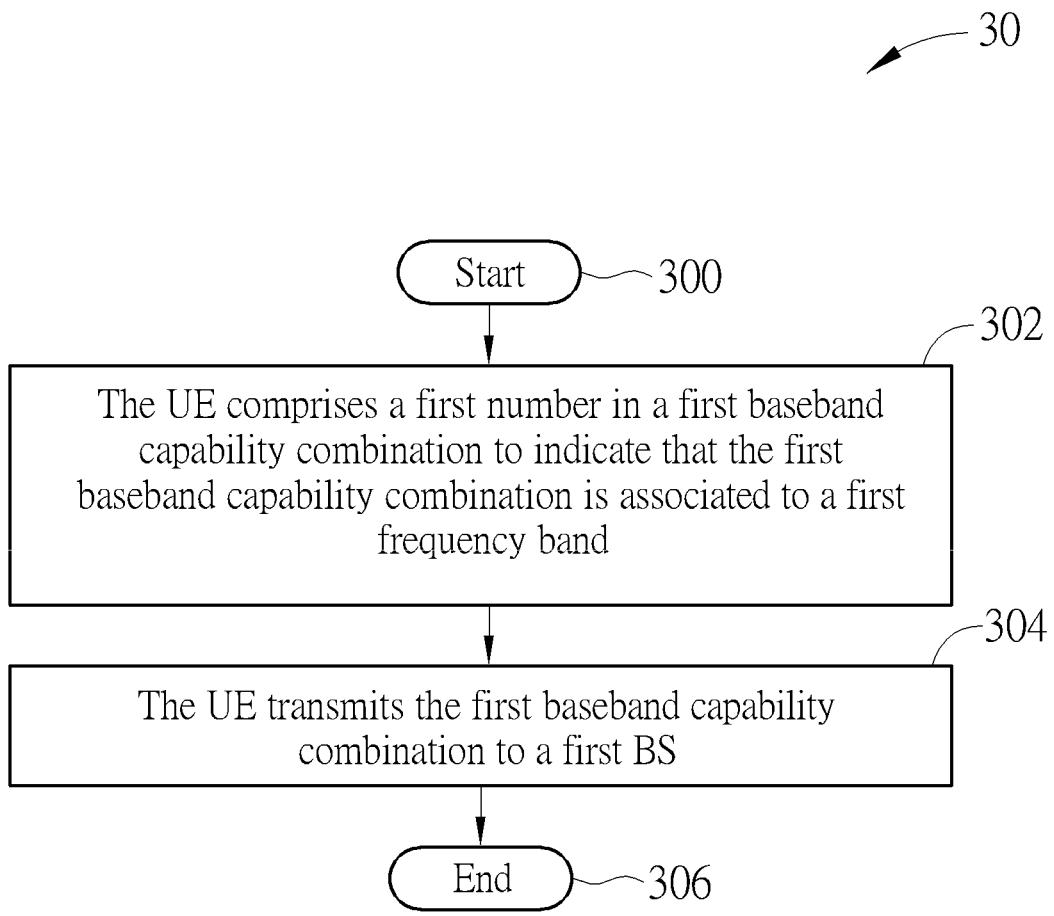
FIG. 3 is a flowchart of a process according to an example of the present invention.

A process 30 in FIG. 3 is utilized in a UE, and includes the following steps:

Step 300: Start.

Step 302: The UE comprises a first number in a first baseband capability combination to indicate that the first baseband capability combination is associated to a first frequency band.

Step 304: The UE transmits the first baseband capability combination to a first BS.

Step 306: End.

According to the process 30, the UE may indicate that baseband capabilities in the first baseband capability combination are associated to the first frequency band. The first BS configures (e.g., uses or applies) at least one of a multiple input multiple output (MIMO) layer, a modulation order and a SCS to (or for) the UE according to the first baseband capability combination for a communication in the first frequency band. Thus, the first BS may perform transmissions or receptions in the first frequency band to the UE according to the at least one of the MIMO layer, the modulation order and the SCS.

In one example, the UE includes a second number in a second baseband capability combination to indicate that the second baseband capability combination is associated to a second frequency band. The UE transmits the second baseband capability combination to the first BS. The first BS configures (e.g., uses or applies) at least one of the MIMO layer, the modulation order and the SCS to (or for) the UE according to the second baseband capability combination. The first BS performs transmissions and receptions in the second frequency band to the UE according to the at least one of the MIMO layer, the modulation order and the SCS. The first number and the second number are different, and the first frequency band and the second frequency band are different. For example, the first number is a first band number identifying the first frequency band, and the second number is a second band number identifying the second frequency band.

In one example, the UE includes the first band number in a third baseband capability combination to indicate that the third baseband capability combination is associated to the first frequency band identified by the first band number. The third baseband capability combination is different from the first baseband capability combination.

In one example, the UE includes the second band number in a fourth baseband capability combination to indicate that the fourth baseband capability combination is associated to the second frequency band identified by the second band number. The fourth baseband capability combination is different from the second baseband capability combination.

In one example, the first BS configures the UE to perform the at least one of a transmission and a reception in the first frequency band according to at least one of the first baseband capability combination and the third baseband capability combination, when receiving the at least one of the first baseband capability combination and the third baseband capability combination.

In one example, the first baseband capability combination includes at least one of a first DL bandwidth class, an first UL bandwidth class, a first MIMO layer, a first modulation order (e.g., 64 QAM, 256 QAM or 1024 QAM), a first number of serving cells (or carriers) (e.g., 1, 2, 3, . . . ) and a first SCS which the UE is capable of (e.g., operating with).

In one example, the second baseband capability combination includes at least one of a second DL bandwidth class, an second UL bandwidth class, a second MIMO layer, a second modulation order, a second number of serving cells (or carriers) (e.g., 1, 2, 3, . . . ) and a second SCS which the UE is capable of (e.g., operating with).

In one example, the third baseband capability combination includes at least one of a third DL bandwidth class, an third UL bandwidth class, a third MIMO layer, a third modulation order, a third number of serving cells (or carriers) (e.g., 1, 2, 3, . . . ) and a third SCS which the UE is capable of (e.g., operating with). An item (e.g., the third MIMO layer) in the third baseband capability combination is different from a corresponding item (e.g., the first MIMO layer) in the first baseband capability combination.

In one example, the fourth baseband capability combination includes at least one of a fourth DL bandwidth class, an fourth UL bandwidth class, a fourth MIMO layer, a fourth modulation order, a fourth number of serving cells (or carriers) (e.g., 1, 2, 3, . . . ) and a fourth SCS which the UE is capable of (e.g., operating with). An item (e.g., the fourth MIMO layer) in the fourth baseband capability combination is different from a corresponding item (e.g., the second MIMO layer) in the second baseband capability combination.

In one example, the first BS configures (e.g., uses or applies) a MIMO layer, a modulation order and/or a SCS to (or for) the UE according to the first DL bandwidth class or the third DL bandwidth class configured to the UE and/or according to the first number of serving cells or the third number of serving cells. Accordingly, the UE uses the MIMO layer, the modulation order and/or the SCS to perform at least one of a transmission and a reception in the first frequency band.

In one example, the first BS configures (e.g., uses or applies) the MIMO layer which is not greater than the first MIMO layer, the modulation order and/or the first SCS, for a DL in the first frequency band to (or for) the UE, when configuring (e.g., using or applying) the first DL bandwidth class and/or the first number of serving cells to (or for) the UE. Accordingly, the UE follows the MIMO layer, the modulation order and/or the first SCS configured by the first BS, to perform at least one of a transmission and a reception in the first frequency band with the first BS.

In one example, the first BS configures (e.g., uses or applies) the MIMO layer which is not greater than the third MIMO layer, the modulation order and/or the third SCS, for a DL in the first frequency band to (or for) the UE, when configuring (e.g., using or applying) the third DL bandwidth class and/or the third number of serving cells to (or for) the UE. Accordingly, the UE follows the MIMO layer, the modulation order and/or the third SCS configured by the first BS, to perform at least one of a transmission and a reception in the first frequency band with the first BS.

In one example, the UE transmits a first baseband combination (BC) to the first BS. The first BC includes (or indicates) the first band number and at least one of the first UL bandwidth class and the first DL bandwidth class, and includes (or indicates) the second band number and at least one of the second UL bandwidth class and the second DL bandwidth class. The first BS may configure a carrier aggregation (CA) or a dual connectivity (DC) to the UE according to the first BC. That is, the first BS configures the UE to perform at least one reception on the first frequency band and/or the second frequency band and to perform at least one transmission on the first frequency band and/or the second frequency according to the first BC. The DC may be a single radio access technology (RAT) DC or a multi-RAT DC (MR-DC). In one example, the first BS knows that the first baseband capability combination is associated to the first BC, since the first baseband capability combination and the first BC share the same band number (i.e., the first band number) and the same UL or DL (UL/DL) bandwidth class(es) (if included in the first baseband capability combination). In one example, the first BS knows that the second baseband capability combination is associated to the first BC, since the second baseband capability combination and the first BC share the same band number (i.e., the second band number) and the same UL or DL (UL/DL) bandwidth class(es) (if included in the second baseband capability combination). Thus, in the CA or the DC, the first BS configures the UE to perform at least one of a transmission and a reception in the first frequency band according to the first baseband capability combination, and configures the UE to perform at least one of a transmission and a reception in the second frequency band according to the second baseband capability combination.

In one example, the UE transmits a second BC to the first BS. The second BC includes (or indicates) the first band number and at least one of the third UL bandwidth class and the third DL bandwidth class, and includes (or indicates) the second band number and at least one of the second UL bandwidth class and the second DL bandwidth class. The first BS may configure a CA or a DC to the UE according to the second BC. That is, the first BS configures the UE to perform at least one reception on the first frequency band and/or the second frequency band and to perform at least one transmission on the first frequency band and/or the second frequency. The DC may be a single RAT DC or a MR-DC. In one example, the first BS knows that the third baseband capability combination is associated to the second BC, since the third baseband capability combination and the second BC share the same band number (i.e., the first band number) and the same UL or DL (UL/DL) bandwidth class(es) (if included in the third baseband capability combination). In one example, the first BS knows that the second baseband capability combination is associated to the second BC, since the second baseband capability combination and the second BC share the same band number (i.e., the second band number) and the same UL or DL (UL/DL) bandwidth class(es) (if included in the second baseband capability combination). Thus, in the CA or the DC, the first BS configures the UE to perform at least one of a transmission and a reception in the first frequency band according to the third baseband capability combination, and configures the UE to perform at least one of a transmission and a reception in the second frequency band according to the second baseband capability combination.

In one example, the UE transmits a third BC to the first BS. The third BC includes (or indicates) the first band number and at least one of the third UL bandwidth class and the third DL bandwidth class, and includes (or indicates) the second band number and at least one of the fourth UL bandwidth class and the fourth DL bandwidth class. The first BS may configure a CA or a DC to the UE according to the third BC. That is, the first BS configures the UE to perform at least one reception on the first frequency band and/or the second frequency band and to perform at least one transmission on the first frequency band and/or the second frequency. The DC may be a single RAT DC or a MR-DC. In one example, the first BS knows that the third baseband capability combination is associated to the third BC, since the third baseband capability combination and the third BC share the same band number (i.e., the first band number) and the same UL or DL (UL/DL) bandwidth class(es) (if included in the third baseband capability combination). In one example, the first BS knows that the fourth baseband capability combination is associated to the third BC, since the fourth baseband capability combination and the third BC share the same band number (i.e., the second band number) and the same UL or DL (UL/DL) bandwidth class(es) (if included in the fourth baseband capability combination). Thus, in the CA or the DC, the first BS configures the UE to perform at least one of a transmission and a reception in the first frequency band according to the third baseband capability combination, and configures the UE to perform at least one of a transmission and a reception in the second frequency band according to the fourth baseband capability combination.

In one example, the UE transmits at least one UE Capability Information message to the first BS. The at least one UE Capability Information message includes the first baseband capability combination, the second baseband capability combination and the first BC. The first BS may transmit the first baseband capability combination, the second baseband capability combination and the first BC to a CN, and the CN stores the first baseband capability combination, the second baseband capability combination and the first BC. The CN may transmit the first baseband capability combination, the second baseband capability combination and the first BC to a second BS, e.g., when the UE connects to the second BS. Further, the at least one UE Capability Information message includes the third baseband capability combination and the second BC, and/or includes the fourth baseband capability combination and the third BC. The first BS may transmit the third baseband capability combination and the second BC to the CN, and the CN stores the third baseband capability combination and the second BC. The CN may transmit the third baseband capability combination and the second BC to the second BS, e.g., when the UE connects to the second BS. The first BS may transmit the fourth baseband capability combination and the third BC to the CN, and the CN stores the fourth baseband capability combination and the third BC. The CN may transmit the fourth baseband capability combination and the third BC to the second BS, e.g., when the UE connects to the second BS.

In one example, the first BS transmits a radio resource control (RRC) message (e.g., RRC Connection Reconfiguration message or RRC Reconfiguration message), a DL control information (DCI) (e.g., on a physical DL control channel (PDCCH)) or a medium access control (MAC) control element (CE) (e.g., in a MAC protocol data unit (PDU)) to the UE, to configure the UE. The first BS may be a master node (MN) or a secondary node (SN).

In one example, the first band number is a NR band number, and the second band number is an E-UTRA band number. Thus, the first frequency band is a NR frequency band, and the second frequency band is an E-UTRA (or LTE) frequency band. In one example, the at least one of the transmission and the reception in the first frequency band is a NR transmission and/or a NR reception. The at least one of the transmission and the reception in the second frequency band is an E-UTRA transmission and/or an E-UTRA reception. In one example, the first band number and the second band number are NR band numbers. Thus, the first frequency band is a NR frequency band, and the second frequency band is a NR frequency band. In one example, the at least one of the transmission and the reception in the first frequency band is a NR transmission and/or a NR reception. The at least one of the transmission and the reception in the second frequency band is a NR transmission and/or a NR reception.

Figure 4:
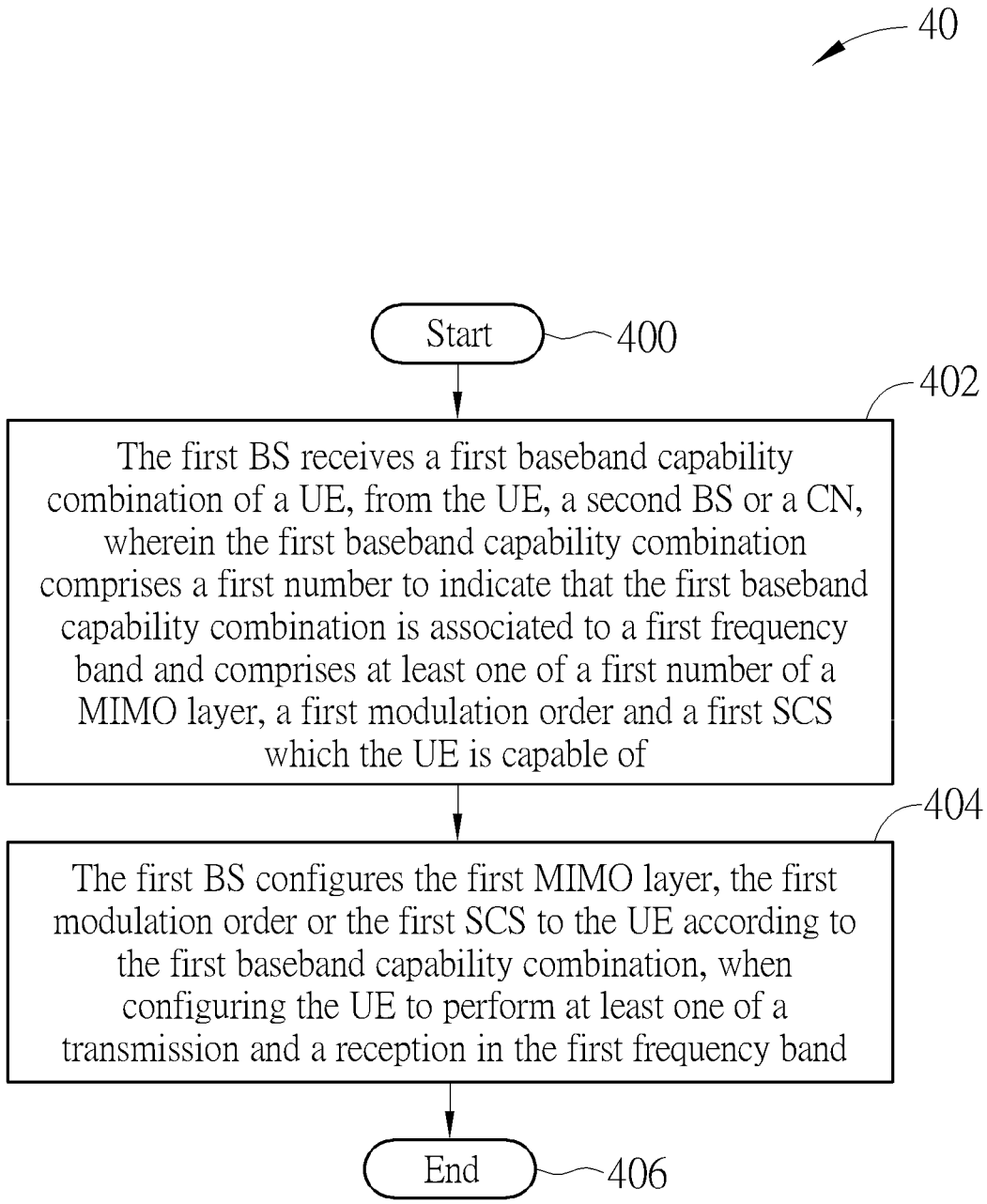
FIG. 4 is a flowchart of a process according to an example of the present invention.

A process 40 in FIG. 4 is utilized in a first BS, and includes the following steps:

Step 400: Start.

Step 402: The first BS receives a first baseband capability combination of a UE, from the UE, a second BS or a CN, wherein the first baseband capability combination comprises a first number to indicate that the first baseband capability combination is associated to a first frequency band and comprises at least one of a first number of a MIMO layer, a first modulation order and a first SCS which the UE is capable of.

Step 404: The first BS configures the first MIMO layer, the first modulation order or the first SCS to the UE according to the first baseband capability combination, when configuring the UE to perform at least one of a transmission and a reception in the first frequency band.

Step 406: End.

In one example, the first BS receives a second baseband capability combination of a UE, from the UE, a second BS or a CN, wherein the second baseband capability combination comprises a second number to indicate that the second baseband capability combination is associated to a second frequency band and comprises at least one of a second number of a MIMO layer, a second modulation order and a second SCS which the UE is capable of. The first BS configures the second MIMO layer, the second modulation order or the second SCS to the UE according to the second baseband capability combination, when configuring the UE to perform at least one of a transmission and a reception in the second frequency band.

The examples of the process 30 may be applied to the process 40, and are not narrated herein.

Figure 5:
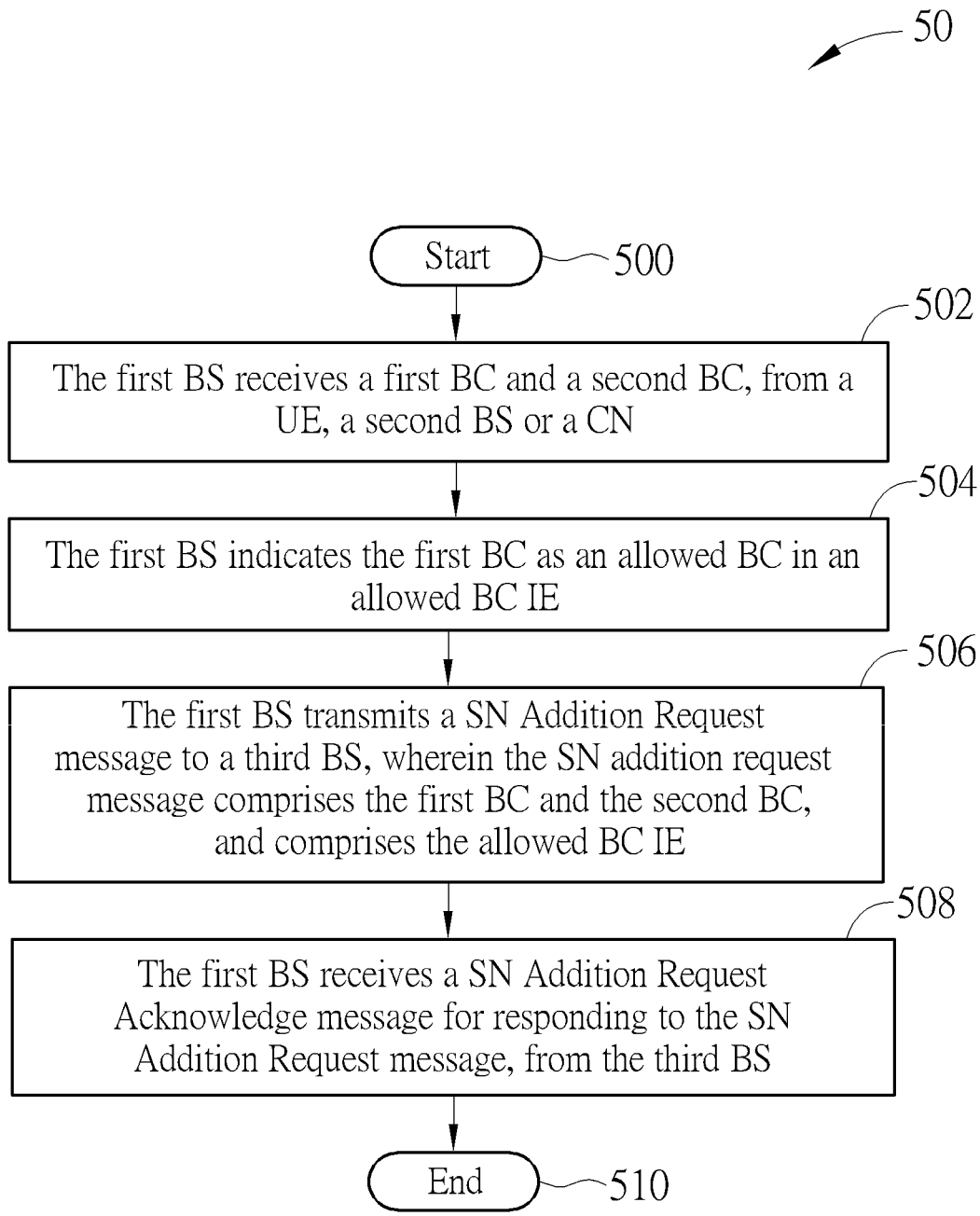
FIG. 5 is a flowchart of a process according to an example of the present invention.

A process 50 in FIG. 5 is utilized in a first BS, and includes the following steps:

Step 500: Start.

Step 502: The first BS receives a first BC and a second BC, from a UE, a second BS or a CN.

Step 504: The first BS indicates the first BC as an allowed BC in an allowed BC information element (IE).

Step 506: The first BS transmits a SN Addition Request message to a third BS, wherein the SN addition request message comprises the first BC and the second BC, and comprises the allowed BC IE.

Step 508: The first BS receives a SN Addition Request Acknowledge message for responding to the SN Addition Request message, from the third BS.

Step 510: End.

In one example, the first BS is a MN, and the third BS is a SN. In one example, the MN is a master eNB, and the SN is a secondary gNB (SgNB). In one example, the MN is a master gNB, and the SN is a secondary eNB. In one example, the MN is a master gNB, and the SN is a SgNB.

In one example, the SN Addition Request message is a SgNB Addition Request message, and the SN Addition Request Acknowledge message is a SgNB Addition Request Acknowledge message. In another example, the SN Addition Request message is a S-Node Addition Request message, and the SN Addition Request Acknowledge message is a S-Node Addition Request Acknowledge message.

In one example, the first BS receives a UE Capability IE including the first BC and the second BC from the UE, the second BS or the CN. The UE Capability IE may include a UE-MR-Capability IE or a UE-NR-Capability IE. The UE Capability IE indicates capabilities supported by the UE.

In one example, the first BS selects (or determines) the first BC as the allowed BC. That is, the first BS determines the second BC as a non-allowed BC. In one example, the allowed BC IE includes the first BC or an index (or indicator) indicating the first BC in the UE Capability IE, and includes neither the first BC nor an index (or indicator) indicating the second BC.

In one example, when receiving the SN Addition Request message, the third BS generates a secondary cell group (SCG) configuration (e.g., a SCG cell group configuration or a RRCReconfiguration message) according to the allowed BC. In one example, the third BS configures the UE to perform at least one of a transmission and a reception in a second frequency band (e.g., the second frequency band in the process 30) according to the allowed BC.

In one example, the first BC includes (or indicates) a first band number and at least one of a first UL bandwidth class and a first DL bandwidth class, and includes (or indicates) a second band number and at least one of a second UL bandwidth class and a second DL bandwidth class. Details of the first BC may be referred to the above examples, and are not narrated herein.

In one example, the second BC includes (or indicates) the first band number and at least one of a third UL bandwidth class and a third DL bandwidth class, and includes (or indicates) the second band number and at least one of the second UL bandwidth class and the second DL bandwidth class. Details of the second BC may be referred to the above examples, and are not narrated herein.

In one example, the SN addition request message includes a third BC. The third BC includes (or indicates) the first band number and at least one of the third UL bandwidth class and the third DL bandwidth class, and includes (or indicates) the second band number and at least one of a fourth UL bandwidth class and a fourth DL bandwidth class. Details of the third BC may be referred to the above examples, and are not narrated herein.

In one example, the first BS receives a first baseband capability combination, a second baseband capability combination, a third baseband capability combination and/or a fourth baseband capability combination, from the UE, the second BS or the CN. Details of the first, second, third and fourth baseband capability combination may be referred to the above examples, and are not narrated herein.

Since the allowed BC is the first BC and the second baseband capability combination is associated to the first BC, the third BS configures the UE to perform at least one of a transmission and a reception in the second frequency band according to the second baseband capability combination. That is, the third BS configures at least one configuration related to at least one item in the second baseband capability combination according to the second baseband capability combination instead of the fourth baseband capability combination. The third BS should not (or is not allowed to) configure at least one configuration over (or not aligned with) what the UE is capable of as indicated in the second baseband capability combination.

In one example, the third BS configures a MIMO layer, a modulation order and/or a SCS (e.g., in the SCG (cell group) configuration, in a DCI, in a RRC message or in a MAC CE), according to the second baseband capability combination instead of the fourth baseband capability combination.

In one example, the first BS configures the UE to perform at least one of a transmission and a reception in a first frequency band (e.g., the first frequency band in the process 30) according to the first BC (i.e., the allowed BC). The first BS should not (or is not allowed to) configure at least one configuration over (or not aligned with) what the UE is capable of as indicated in the first baseband capability combination.

The examples of the process 30 may be applied to the process 50, and are not narrated herein.

The following examples may be applied to the processes 30-50.

In one example, a baseband capability combination above includes a UL MIMO layer and a DL MIMO layer instead of a MIMO layer. A BS above configures the UE to perform a transmission according to the UL MIMO layer, and configures the UE to perform a reception according to the DL MIMO layer in the above description.

In one example, a baseband capability combination above includes a UL SCS and a DL SCS. A BS above configures the UE to perform a transmission according to the UL SCS, and configures the UE to perform a reception according to the DL SCS in the above description.

In one example, the first BC indicates that the UE in the MR-DC is capable of (e.g., operating at) "M" (e.g., M=2) carrier(s) in a first RAT (e.g., E-UTRA) in first frequency band(s) and "N" (e.g., N=2) carrier (s) in a second RAT (e.g., NR) in second frequency band (s). The second BC indicates that the UE in the MR-DC is capable of (e.g., operating at) "X" (e.g., X=1) carrier (s) in the first frequency band (s) in the first RAT and "Y" (e.g., Y=3) carrier(s) in the second RAT in the second frequency band(s). According to the process 50, the third BS is not allowed to configure the UE to receive on more than N carriers in the second frequency band(s).

In one example, at least one baseband capability (e.g., MIMO layer, SCS or modulation order) in the base band capability combination may be different.

In one example, a baseband capability combination above has an index (or a baseband capability combination number) uniquely identifying the baseband capability combination. In some implementations, the baseband capability combination includes the index. In other implementations, the baseband capability combination is included in a container. The baseband capability combination is implicitly assigned the index by a position in the container. A BC above includes the index (or the baseband capability combination number) to indicate that the baseband capability combination is associated to the BC. In one example, a band number may or may not be needed in the baseband capability combination if the index exists.

It should be noted that although the above examples are illustrated to clarify the related operations of corresponding processes, the examples can be combined and/or modified arbitrarily according to system requirements and/or design considerations. Message names and IE names described above are examples and may not narrow a scope of the invention.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling UE capabilities. A baseband capability combination includes an index (or a baseband capability combination number) identifying the baseband capability combination, and a BC includes the index (or the baseband capability combination number) to indicate that the baseband capability combination is associated to the BC. Thus, the problem of handling UE capabilities can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling user equipment (UE) capabilities, comprising:
at least one storage device; and
at least one processing circuit, coupled to the at least one storage device, wherein the at least one storage device stores, and the at least one processing circuit is configured to execute instructions for:
receiving a first band combination (BC) and a second BC, from a UE, a second BS or a core network (CN);
transmitting a Secondary Node (SN) Addition Request message to a third BS, wherein the SN addition request message comprises the first BC and the second BC, and comprises a allowed BC information element (IE) indicating the third BS to configure the UE to perform at least one of a transmission and a reception in a frequency band according to the first BC;
receiving a SN Addition Request Acknowledge message for responding to the SN Addition Request message, from the third BS.

2. The first BS of claim 1, wherein the allowed BC IE comprises the first BC or an index indicating the first BC in an UE Capability IE.

3. The first BS of claim 1, wherein the first BC comprises a first band number and at least one of a first uplink (UL) bandwidth class and a first downlink (DL) bandwidth class, and comprises a second band number and at least one of a second UL bandwidth class and a second DL bandwidth class; and the second BC comprises the first band number and at least one of a third UL bandwidth class and a third DL bandwidth class, and comprises the second band number and at least one of the second UL bandwidth class and the second DL bandwidth class.

4. A user equipment (UE) for handling UE capabilities, comprising:
- at least one storage device; and
- at least one processing circuit, coupled to the at least one storage device, wherein the at least one storage device stores, and the at least one processing circuit is configured to execute instructions for:
- generating a first number in a first band combination to indicate that at least two of a first number of a multiple input multiple output (MIMO) layer, a first modulation order, a first subcarrier spacing (SCS), a downlink (DL) bandwidth class and an uplink (UL) bandwidth class;
- including a second number in a second band combination to indicate that at least two of a second MIMO layer, a second modulation order and a second SCS;
- transmitting the first band combination and the second band combination to a base station (BS); and
- receiving, from the BS, a radio resource control (RRC) message, a DL control information (DCI) or a medium access control (MAC) control element (CE) configuring the UE to perform the at least one of the transmission and the reception in the first frequency band according to the first band combination.

5. The UE of claim 4, wherein the first band combination comprises a number of serving cells.

6. A first base station (BS) for handling user equipment (UE) capabilities, comprising:
- at least one storage device; and
- at least one processing circuit, coupled to the at least one storage device, wherein the at least one storage device stores, and the at least one processing circuit is configured to execute instructions for:
- receiving a band combination of a UE, from the UE, a second BS or a core network (CN), wherein the band combination includes a number to indicate that at least two of a number of a multiple input multiple output (MIMO) layer, a modulation order and a subcarrier spacing (SCS); and
- configuring the MIMO layer, the modulation order or the SCS to the UE according to the band combination, when configuring the UE to perform at least one of a transmission and a reception in the frequency band.

7. The first BS of claim 6, wherein the instructions further comprise:
- performing the at least one of the transmission and the reception in the frequency band to the UE according to the MIMO layer, the modulation order or the SCS.

8. The first BS of claim 6, wherein the instructions further comprise:
- configuring the UE to perform the at least one of the transmission and the reception in the frequency band according to the band combination.

9. The first BS of claim 6, wherein the instructions further comprise:
- transmitting to the UE a radio resource control (RRC) message, a DL control information (DCI) or a medium access control (MAC) control element (CE) configuring the MIMO layer, the modulation order or the SCS to the UE according to the band combination.

10. The first BS of claim 6, wherein the instructions further comprise:
- transmitting to the UE a radio resource control (RRC) message, a DL control information (DCI) or a medium access control (MAC) control element (CE) configuring the UE to perform the at least one of the transmission and the reception in the frequency band according to the band combination.

11. The UE of claim 1, wherein the instructions further comprising:
- configuring the UE to perform at least one of a transmission and a reception in a frequency band according to the first BC.

12. The UE of claim 1, wherein the instructions further comprising:
- transmitting a radio resource control (RRC) message, a DL control information (DCI) or a medium access control (MAC) control element (CE) to the UE, to configure the UE to perform at least one of a transmission and a reception in a frequency band according to the first BC.

* * * * *